March 21, 1967 F. K. SMITH 3,310,118
CONTROLLABLE PITCH BOAT PROPELLER
Filed July 13, 1966
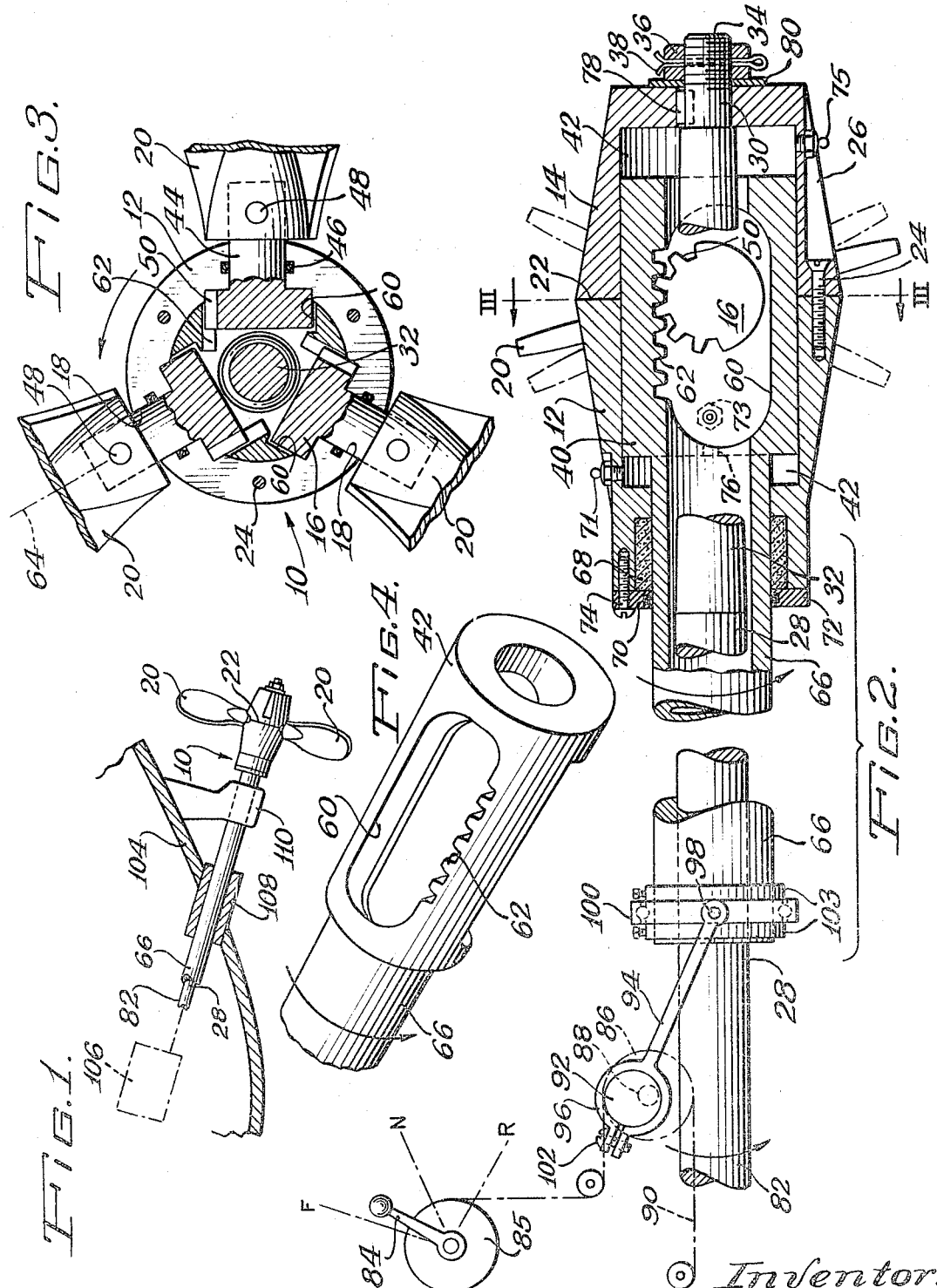
Inventor:
Franklin K. Smith
By John W. Gaines Atty.

United States Patent Office 3,310,118
Patented Mar. 21, 1967

3,310,118
CONTROLLABLE PITCH BOAT PROPELLER
Franklin K. Smith, McHenry County, Ill.
(180 N. Main St., Crystal Lake, Ill. 60014)
Filed July 13, 1966, Ser. No. 564,855
6 Claims. (Cl. 170—160.43)

This application relates to a boat propulsion drive, and more particularly to a controllable pitch propeller for boats.

Hitherto in apparatus which causes the propeller or propellers to give varying speeds to a boat, in either a forward or backward direction by causing a change in pitch setting of the blades, such apparatus has proved complicated and difficult to hold in adjustment such that the blades do not drift out of their pitch setting; also in some cases, the hub which carries the blades has an unstreamlined and cumbersome design creating drag and turbulence in the direction perpendicular to the planes of rotation of the blades; such hub and its internal structure such as pitch setting racks have in instances included a large number of and a complicated set of parts; such internal structure due to its bulk and diameter has required a large size hub for housing the structure; the blades in other cases have been in a staggered arrangement on the hub so that there are two or more planes of rotation by which the blades create turbulence ahead of one another as they advance in the water; or the prior blade openings and other external openings in the hub have obviated proper lubrication of the internal structure, from which the water has not or could not have been sealed out; or a combination of those difficulties has existed.

My invention materially reduces or largely eliminates the foregoing difficulties through the provision of small diameter gear rack structure made of one piece of material, and a streamline hub which houses that structure in a manner by which the external openings are formed with proper shape and with proper means to seal out the water and to seal in the necessary lubricant internally provided therewithin, and a coplanar blade arrangement rigidly anchored in the waterproof hub, all as will now be explained. Further features, objects, and advantages will either be specifically pointed out or become apparent when, for a better understanding of my invention, reference is made to the accompanying drawing which shows a preferred embodiment thereof and in which:

FIGURE 1 shows, in a longitudinal elevational view, a portion of a marine vessel embodying the present invention;

FIGURE 2 is a longitudinal sectional view showing the drive portion of FIGURE 1;

FIGURE 3 is a transverse sectional view taken along the lines III—III of FIGURE 2; and FIGURE 4 is an isometric view of a one-piece gear sleeve in the drive.

More particularly in the figures of drawing, a streamline propeller hub 10 is formed of joined halves 12 and 14 constituting respective front and rear housings. Several propeller pinion stems or shafts 16—three being illustrated—project through individual sealed external openings 18 in the hub so that the shafts are coplanar, and the shafts and three generally flat blades 20 thereon are in right angular relationship to the hub.

The three openings 18 are bisected by the junction between the hub halves and, except for those openings, the end faces 22 of the hub halves are coated with a liquid gasket compound referred to hereinafter as the hub sealant and consisting of a water insoluble bonding resin that is commercially available. Several bolts or screws 24, inserted from side recesses 26 in the rear half 14, bolt together the hub halves to form a water tight assembly.

A main shaft 28, which is coaxial with the hub 10, has an end portion extending therethrough including a slotted shaft section 30, a forward section 32 which tapers in the direction of the slotted section 30, and a threaded terminal portion 34 which projects beyond the rear end of the hub 10. A nut 36 on the threaded portion is locked in place by a cotter pin 38.

The tapered section 32 and the hub 10 define an annular space that is occupied by a gear sleeve or, more technically, a rack sleeve 40. The sleeve 40 divides the space into a chamber 42 with front, middle, and rear portions.

Each pinion shaft 16 has a smooth cylindrical portion 44 journalled in one opening 18 and sealed by an O-ring 46 in the opening. At the outer end, each shaft 16 is socketed in and pinned at 48 to the blade 20 carried thereby. At the inner end, each shaft carries a mutilated pinion having a sector of pinion teeth 50 provided only partway therearound, the balance of the pinion remaining an uncut blank.

Each pinion fits in a longitudinally extending slot 60 formed in the gear sleeve 40 so as to register with, and extend axially at both ends beyond, the associated pinion shaft opening 18.

The pinion teeth 50 mesh with respective sets of rack teeth 62 which are along one side of and each in the plane of the associated slot 60. Longitudinal movement of the gear sleeve 40 causes the shafts 16 and blades 20 to rotate in coordinated movement about their individual radial axes 64. Each blade 20 is characterized by equal surface areas on opposite sides of its axis 64 so as to be in hydraulic balance while it revolves, irrespective of its angle of rotation or pitch setting.

A main sleeve 66, which forms an integral prolongation or continuation of the gear sleeve 40, extends forwardly through first sealing means 68 comprising packing and second sealing means 70 comprising a conventional O-ring, which are carried in a respective recess and in a front cover plate 72 on the front hub half 12. A coat of the referred to hub sealant is applied where necessary to the front cover plate, and screws 74 are threaded into the hub half to hold the plate in place.

The front portion of the chamber 42 in the hub is charged with a semi-solid lubricant such as Lubriplate by one of the several recessed grease fittings 71, 73, and 75 in the hub, and the rear and middle portions of the chamber are similarly lubricant charged. A short channel 76 is formed if desired in the outside surface of the sleeve 40 to establish free communication between the front and middle portions of the chamber 42. The lubricant makes pitch setting easy, it keeps the rack and pinion teeth 62 and 50 lubricated, and it constitutes a secondary barrier to the entry of water into the sealed hub.

Under forced turning of the main or propeller shaft 28, all parts assembled with the hub revolve in unison. The hub 10 revolves because of a key 78 connecting the slotted section 30 of the shaft and the rear of the hub. The pinion shafts 16 revolve because captive within the openings 18 of the hub, and the blades 20 revolve with the pinions. The gear sleeve 40 revolves because of the keying effect of the mutilated pinions, each of which is in the plane of one slot in the sleeve 40.

A coat of the referred to hub sealant is applied, in the vicinity of the key 78, to a washer 80 under the nut at the rear of the hub 10 and to the hub and shaft to prevent the entry of water.

The main sleeve continuation 66, being the outside part of the shaft assembly, extends forwardly coaxially with the main shaft 28, which shaft for its major portion is co-extensive in length with the continuation 66 and which extends therebeyond at the shaft front end 82.

A speed and directional control includes a pivoted operator's handle 84 which takes the positions indicated by directional abbreviations in FIGURE 2 and which moves an attached sprocket 85 to corresponding positions. A pitch setting sprocket 86 operates a cross shaft 88 and is connected by a sprocket chain 90 so as to take positions dictated by the sprocket 85.

The cross shaft 88 is connected to the main sleeve continuation 66 in a mechanical path including a pair of identical eccentrics 92 fixed one at each end of the shaft 88, a pair of connecting links 94 each having a split eye 96 at one end and encircling one eccentric, and each having a pivot 98 at the other end connected to the outer race of a ball bearing 100 having an inner race embracing the main sleeve continuation 66.

An adjusting screw 102 is threaded into the split eye 96 of each link 94, providing adjustable gripping means about the eccentric 92 to prevent looseness or unwanted relative turning. Set-screw collars 103 on the main sleeve 66 fix the ball bearing 100 in the axially adjusted position desired on the sleeve 66. The longitudinal movement of the gear sleeve 40 is limited at opposite ends of travel by engagement with the hub, which at those ends forms front and rear closure means for the lubricant chamber 42.

In operation, a boat 104 (FIGURE 1) is propelled through the water by an inboard engine 106 which turns in a constant direction and which is connected to the front end 82 of the main shaft by a conventional coupling or the like. The assembly of shafts of 66 and 28 passes through a shaft log 108 and a rear strut bearing 110 carried by the boat, and carries the assembly including the hub 10 at the outboard end. Cranking of the engine is accomplished after setting the blades 20 in flat pitch affording a zero angle of attack. The vessel is then advanced forwardly or rearwardly at increased or decreased speeds depending upon the increased or decreased positive or negative angle to which the blades 20 are set according to the handle 84.

From the foregoing, it is seen that I have provided, with minimal parts, a streamlined, waterproof, low diameter hub mechanism for operating controllable blades. In event of breakage of the key 78 due to a blade 20 becoming fouled, the pin 38 and nut 36 serve as retaining means preventing loss of the assembly, which will merely cease to revolve under power. Servicing, including replacement of the packing 68 and re-charging portions of the chamber 42 with lubricant through the grease fittings, is readily accomplished and replacement of the key 78 is readily accomplished. Because of the taper, the relative relief between the shaft section 32 and the gear sleeve 42 affords an adequate clearance passage for the transfer of lubricant between the slotted middle and the rear portions of the lubricant chamber 42.

Because the sleeve 42 is made in one piece (stainless steel, if desired) the chances are obviated that the blades 20 will vary one to the other in pitch angle. In other words, the rack teeth 62 stay fixed and have no way of getting transversely out of line with one another, because they are precisely aligned when initially formed in the companion slots 60.

What is claimed is:
1. In a marine propulsion drive:
   a hub having propeller pinion shafts journalled in sealed external openings therein, with the shafts generally in a coplanar arrangement with one another and in right angular relationship to the hub;
   a main shaft arranged in the hub, and with an annular space between;
   a one-piece gear sleeve between the hub and shaft capable of longitudinal movement within said space;
   there being pinion shaft receiving slots formed in the one-piece gear sleeve, registered in the radial direction with the hub openings and elongated in the longitudinal direction, the pinion shafts and gear sleeve having means establishing interengagement therebetween within the sleeve slots;
   forward closure means sealing the hub and a main sleeve continuation of the gear sleeve at a first end;
   means for imparting rotational movement to said shaft and thereby to the hub and pinion shafts for revolving the drive at a desired speed setting;
   means for imparting the longitudinal movement to the main sleeve and thereby to the gear sleeve for turning the pinion shafts into a desired pitch setting; and
   rearward closure means sealing, and providing the sole mechanical interconnection between, the hub and said shaft at a second end; said interengagement characterized by pinions, and mating rack teeth (62) formed integral with the gear sleeve and confined within the slots; each pinion shaft characterized by:
      a smooth journal intermediate the ends thereof;
      a blade carried at the outer end preventing inward radial movements of the shaft; and
   one of said pinions carried at the inner end, said pinion meshing with the adjacent rack teeth and preventing both relative rotational movement of the gear sleeve and outward radial movement of the shaft; the means for imparting longitudinal movement characterized by:
      a rotatable eccentric (92);
      screw adjusted gripping means on the eccentric;
      a link interconnecting the gripping means and the main sleeve continuation; and
   manual means for rotating the eccentric; the shaft tapering in the direction of the second end so as to provide relief whereby the slots in the gear sleeve intercommunicate with one another and with the space between the shaft and hub at said second end; the sleeve dividing said space into chamber portions; and
   lubricant fitting means in the hub communicating with a plurality of said chamber portions.

2. The invention of claim 1, characterized by:
   the hub being in halves (12, 14) separably connected in the plane of the coplanar shafts.

3. The invention of claim 2, characterized by:
   the mechanical interconnection comprising a key at the second end of the hub and shaft; and
   retainer means at said second end to retain the hub on the shaft.

4. The invention of claim 3, each blade characterized by equal surface areas on opposite sides of its radial axis (64) so as to be in hydraulic balance while revolving.

5. The invention of claim 4, the pinions characterized by mutilated pinions each having teeth extending no more than partway around the periphery.

6. The invention of claim 5, the forward and rearward closure means at the respective ends of the gear sleeve being each engageable with, and stopping the longitudinal movement of, the sleeve at that end to limit the angular setting of the pinion shafts and blades.

References Cited by the Examiner
UNITED STATES PATENTS

| | | | |
|---|---|---|---|
| 524,500 | 8/1894 | Hindes | 170—160.43 |
| 861,612 | 7/1907 | Shultz | 170—160.23 |
| 1,047,999 | 12/1912 | Shillinger | 170—160.43 |
| 1,125,719 | 1/1915 | Ritchie | 170—160.43 |
| 2,704,991 | 3/1955 | Danielson. | |
| 3,051,249 | 8/1962 | Dirlik | 170—160.23 X |
| 3,095,932 | 7/1963 | Hercules | 170—160.43 |

MARTIN P. SCHWADRON, *Primary Examiner.*

EVERETTE A. POWELL, JR., *Examiner.*